UNITED STATES PATENT OFFICE.

JOHN BOLTON, OF PUTNAMVILLE, ASSIGNOR OF ONE-HALF OF HIS RIGHT TO DAVID BOLTON, OF COAL CITY, INDIANA.

REMEDY FOR HOG-CHOLERA.

SPECIFICATION forming part of Letters Patent No. 230,997, dated August 10, 1880.

Application filed January 12, 1880.

*To all whom it may concern:*

Be it known that I, JOHN BOLTON, of Putnamville, in the county of Putnam and State of Indiana, have invented a new and Improved Compound for Hog-Cholera; and I do hereby declare that the following is a full, clear, and exact description of the same.

My invention relates to a novel compound for the treatment of hog-cholera; and it consists of the following ingredients: Sulphate of potash, sulphate of iron, sulphate of soda, borax, sulphur, and sulphate of copper. About one-eighth of an ounce of each of the above ingredients is mixed in one quart of soft water. Of this mixture one table-spoonful constitutes a dose, which is administered in a small quantity of soft soap.

If the animal will not take the dose it must be administered by drenching.

In defining my invention more clearly I would state that I make no claim to the ingredients herein described, except when they are used together and in about the proportion described, as I am aware that most or all of the said ingredients have been used separately for a like purpose.

Having thus described my invention, what I claim as new is—

The composition for the treatment of hog-cholera, consisting of sulphate of potash, sulphate of iron, sulphate of soda, borax, sulphur, and sulphate of copper compounded in or about in the proportions named.

The above specification of my invention signed by me this 3d day of January, A. D. 1880.

JOHN BOLTON.

Witnesses:
WM. D. SMYTHE,
HENRY H. MATHIAS.